(12) United States Patent
Gallet et al.

(10) Patent No.: US 9,567,090 B2
(45) Date of Patent: Feb. 14, 2017

(54) PYLON FOR MOUNTING AN ENGINE ON THE STRUCTURE OF AN AIRCRAFT

(71) Applicant: SNECMA, Paris (FR)

(72) Inventors: Francois Gallet, Paris (FR); Patrick Joyez, Cesson (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/427,189

(22) PCT Filed: Sep. 12, 2013

(86) PCT No.: PCT/FR2013/052101
§ 371 (c)(1),
(2) Date: Mar. 10, 2015

(87) PCT Pub. No.: WO2014/041310
PCT Pub. Date: Mar. 20, 2014

(65) Prior Publication Data
US 2015/0239569 A1    Aug. 27, 2015

(30) Foreign Application Priority Data

Sep. 13, 2012    (FR) ...................... 12 58627

(51) Int. Cl.
*B64D 27/26*    (2006.01)
*B64D 27/12*    (2006.01)
(Continued)

(52) U.S. Cl.
CPC ............... *B64D 27/26* (2013.01); *B64C 11/48* (2013.01); *B64D 27/12* (2013.01);
(Continued)

(58) Field of Classification Search
USPC .......................................................... 244/54
See application file for complete search history.

(56) References Cited

U.S. PATENT DOCUMENTS 5,775,638 A     7/1998  Duesler
7,726,602 B2 *  6/2010  Llamas Sandin ...... B64D 27/14
                                                    244/54
(Continued)

FOREIGN PATENT DOCUMENTS

EP    2 030 892 A1    3/2009
FR    2 917 379 A1    12/2008

OTHER PUBLICATIONS

International Search Report issued Dec. 11, 2013 in PCT/FR2013/052101 Filed Sep. 12, 2013.

*Primary Examiner* — Timothy D Collins
*Assistant Examiner* — James Atwell
(74) *Attorney, Agent, or Firm* — Oblon, McClelland, Maier & Neustadt, L.L.P.

(57) ABSTRACT

A system for pylon attachment for mounting an engine on a structure of an aircraft, or to wings of the aircraft, is provided. The system includes a first attachment mechanism that can be secured to the pylon and a second attachment mechanism that can be secured to the structure of the aircraft. A connection mechanism connects the first and second attachment mechanism. The connection mechanism allows movement of the first attachment mechanism in relation to the second attachment mechanism between first and second positions.

7 Claims, 1 Drawing Sheet

(51) Int. Cl.
*B64C 11/48* (2006.01)
*B64D 27/00* (2006.01)

(52) U.S. Cl.
CPC .. *B64D 2027/005* (2013.01); *B64D 2027/264* (2013.01); *Y02T 50/66* (2013.01)

(56) References Cited

U.S. PATENT DOCUMENTS

| | | | | |
|---|---|---|---|---|
| 8,191,823 | B2* | 6/2012 | Guering | B64C 15/12 244/54 |
| 8,240,600 | B2* | 8/2012 | Balk | B64D 27/26 244/54 |
| 8,444,085 | B2* | 5/2013 | Stretton | B64D 27/12 244/54 |
| 2009/0084893 | A1 | 4/2009 | Balk | |
| 2011/0192933 | A1 | 8/2011 | Guering et al. | |
| 2011/0259996 | A1* | 10/2011 | Vetters | B64D 27/10 244/54 |

* cited by examiner

PYLON FOR MOUNTING AN ENGINE ON THE STRUCTURE OF AN AIRCRAFT

FIELD OF THE INVENTION

The present invention relates to the mounting of a propulsion engine on the structure of an aircraft. It relates in particular to the mounting of an engine comprising an upstream propeller.

PRIOR ART AND DISCLOSURE OF THE PROBLEM

Propulsion engines on aircraft may be mounted at various points on the fuselage or wings. When they are mounted so as to be suspended under the wings, a strut or boom connects them to the structure of the wing through the bottom face thereof. For reasons of space and aerodynamic constraints, the engines extend at least partly upstream beyond the leading edge of the wing from which they are suspended.

The present invention relates in particular to engines comprising a propeller in the upstream position. This may be a simple propeller such as in a turboprop engine or a double propeller formed by two contra-rotating rotors. The invention relates more particularly to a transonic propeller engine, also referred to as an unducted fan engine or "open rotor" engine. The propeller is driven by an engine that is generally a gas turbine engine situated in the axial extension thereof.

Said engines offer a great advantage since the specific consumption thereof is very favourable and use thereof leads to fuel savings. However, this configuration suspended under the wing is detrimental on an acoustic level because of the fact that, when the aircraft follows an ascending path, at take-off in particular, by being inclined with respect to its horizontal movement component, the propeller is subjected to an air flow of which the direction forms a non-zero angle with its rotational axis.

The present applicant has adopted the object of improving the aerodynamic flow around the engine when the aircraft is climbing and is following an ascending path.

DISCLOSURE OF THE INVENTION

This objective is achieved with an assembly of a propulsion engine together with its strut and a system for attaching the strut. The system for attaching a strut for mounting a propulsion engine on the structure of an aircraft, in particular on its wing, comprises a first attachment means, the first attachment means being able to be fixed to the strut, and a second attachment means, the second attachment means being able to be fixed to the structure of the aircraft.

The above assembly is characterised in that it comprises a deformable connection means connecting the first attachment means to the second attachment means, the connection means being arranged so as to allow the movement of the first attachment means relative to the second attachment means between a first and a second position when the thrust of the engine exceeds a given threshold.

For the engine suspended from the wings of the aircraft by such a system for attaching the strut, it is thus possible to adapt its position in an optimum fashion with respect to the direction of flight while reducing the drag from the interaction with the wings. Furthermore, since the aerodynamic flow is improved, the acoustic impact of the propeller is reduced thereby.

Moreover, the tilting of the engine causes an increase in the lift of the wing. This helps to limit the length of runway required for the aircraft to take off.

In accordance with another feature, the first position of the first attachment means corresponds to a position of the engine when the aircraft is in cruising flight and the second position corresponds to a position of the engine when the aircraft is following an ascending path, in particular at take-off.

In accordance with one embodiment of the invention, the connection means forms a deformable trapezoidal structure with two vertices of the trapezium fixed with respect to the first attachment means and two other vertices of the trapezium fixed with respect to the second attachment means.

Advantageously, the connection means comprises a movement damper. The function of such a damper is to provide flexible and continuous deformation, without any jolt, of the connection means. Optionally the damper is associated with a member for returning to the first position in the absence of any force urging it to move it towards the second position. In this way a safety position is guaranteed in the event of malfunction.

According to one embodiment, the deformation of the connection means is controlled by an actuator. It is thus possible to manually control the position of the engine having respect to the wings.

The connection means is thus arranged with respect to the engine so as to allow movement of the first attachment means with respect to the second attachment means when it is subjected to a sufficient force, corresponding to the thrust exerted on the first attachment means, this thrust exceeding a threshold. The threshold preferably corresponds to the thrust of the engine when the aircraft is climbing.

According to one embodiment, the tilting force to which the engine is subjected is the forces resulting from the thrust and the weight of the engine.

The invention finds a particular application for an engine having an upstream propeller, in particular for an engine having a transonic propeller.

BRIEF DESCRIPTION OF THE FIGURES

The invention will be better understood, and other aims, details, features and advantages thereof will emerge more clearly with the following detailed explanatory description of an embodiment of the invention given by way of purely illustrative and non-limitative example with reference to the accompanying schematic drawings.

In the drawings.

DESCRIPTION OF AN EMBODIMENT OF THE INVENTION

Figure 1:
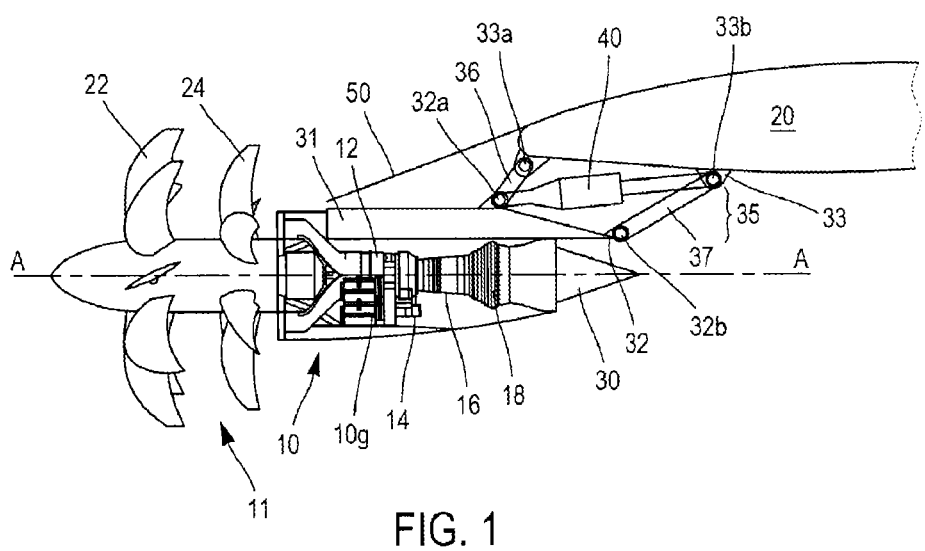
FIG. 1 schematically shows an engine having contra-rotating propellers mounted under a wing in accordance with the invention and in the cruising position.

With reference to FIG. 1, a turboshaft engine 10 of the "open rotor" type can be seen—this expression designates a pair of unducted propellers. The pair of propellers 11 is disposed upstream of the engine in the extension of its rotational axis. Said engine comprises, from upstream to downstream, in the direction of flow of the gases in the engine, air inlets 100 communicating with a compressor 12, an annular combustion chamber 14 and two turbines 16 and 18. The turbines are each connected to one of the rotors 22, 24 of the propeller that they drive.

The air flow that enters the compressor 12 is compressed and then mixed with fuel and burnt in the combustion chamber 14. The combustion gases are then injected into the turbines in order to rotate the rotors of the propeller, which supply the major part of the thrust generated by the engine. The combustion gases emerge from the turbines and are expelled through a pipe 30 in order to increase the thrust.

The propellers 22, 24 are coaxial and disposed one behind the other. In a known fashion, each of these propellers 22, 24 comprises a plurality of blades that are regularly distributed around the axis AA of the engine. Each blade extends substantially radially in a plane perpendicular to the rotational axis, and comprises an upstream edge forming the leading edge of the blade, a downstream edge forming the trailing edge, a radially internal end forming the root of the blade, and a radially external end forming the tip of the blade.

The engine is suspended from a wing 20 of an aircraft by means of a strut 31. This strut comprises firstly attachments to the engine (not detailed here), and secondly a system for attachment to the structure of the wing. The attachment system comprises first 32 and second 33 attachment means and a means 35 for interconnecting them. The first attachment means 32 is represented here by yokes articulated to the strut 31, which is itself fixed at various points to the casing of the engine. The second attachment means 33 is represented here by articulated yokes which are rigidly connected to the structure of the wing 20. These attachment means are depicted schematically and can be implemented by any means within the capability of a person skilled in the art.

In accordance with the invention, a deformable connection means 35 connects the two attachment means 32 and 33. This connection means comprises, according to the embodiment of this example, two rigid connecting rods 36 and 37 articulated to the attachment means 32 and 33 respectively, so as to form a deformable trapezoidal quadrilateral. The lengths of these connecting rods will be calculated according to the type of movement required for the engine. In the example in FIGS. 1 and 2, the downstream connecting rod 37 is the longest, so that the engine inclines downwards when it moves forwards. The four vertices of the quadrilateral are 32a and 32b on the first means of attachment, to the engine, and 33a and 33b on the second means of attachment, to the structure of the wing. Thus, it if is considered that the structure of the wing is fixed, the first attachment means 32 can move relative to the structure of the wing.

The trapezoidal quadrilateral is situated at the rear of the centre of gravity 10g of the engine 10. In this way, at rest, the weight of the engine tends to return it towards the rear. It comes into abutment against stops (not shown) on the articulations, for example, which hold it in a first low position as shown in FIG. 1. In this first position the engine has a horizontal axis AA. This is the position when the aircraft is on the ground and stopped (assumed to be horizontal) and in cruising flight.

Figure 2:
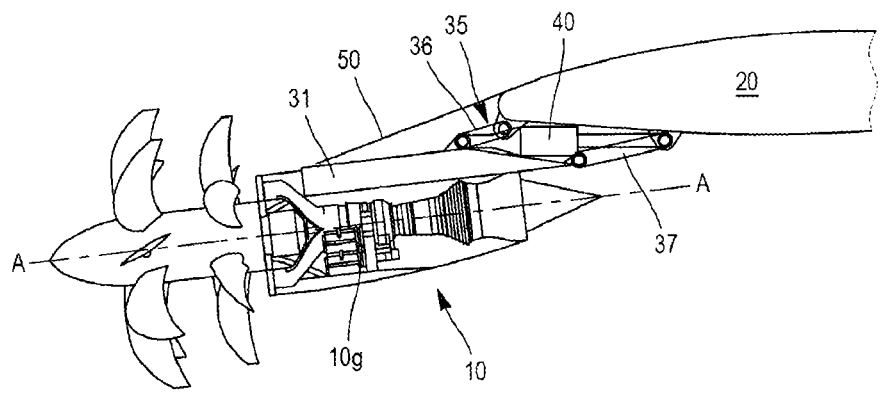
FIG. 2 shows the engine of FIG. 1 tilted into the inclined position with respect to the wing.

Through the deformation of the trapezoidal quadrilateral around fixed points that constitute the second means 33 of attachment to the structure of the wing, the engine can adopt a second so-called take-off position, which is shown in FIG. 2. As the two connecting rods are not of equal lengths between the attachments, their pivoting about articulations on the structure of the wing causes the engine to tilt downwards.

A damping member 40 is disposed inside the quadrilateral between two opposite vertices so as to provide flexible movement without any jolt. Optionally, the damper is associated with a return element, such as a spring, for balancing the forces and so as to provide an automatic return position in the event of malfunction.

A fairing 50, having suitable flexibility and deformation, advantageously surrounds the elements of the strut so as to ensure good quality of the aerodynamic flow above the engine. This fairing has variable geometry in order to adapt to the various configurations of the deformable trapezium.

The change from the low position to the second position is made possible according to a preferred embodiment by the variation in thrust exerted on the structure of the wing by the engine between stoppage and cruising flight on the one hand and the take-off phase of the aircraft on the other hand. In the first case the thrust is zero or low. Under the forces of gravity, the engine is placed in the low position and the connection means 35 is under compression. This is because the assembly is arranged so that the torque exerted by the thrust on the connection means is in opposition to the torque exerted by the weight of the engine at the centre of gravity 10g.

When the aircraft is in the ascending flight phase, at take-off in particular, the thrust is high. The engine pulls greatly on the strut. The torque exerted by the thrust overcomes that of the weight. The quadrilateral deforms and comes into abutment in a second position. The axis AA of the engine has tilted in order to adopt a position forming a given angle with that of the wing.

In this position the engine is inclined and its propeller blows directly onto the wing with an angle of incidence that causes an increase in the lift of the wing. This helps to limit the length of runway necessary for take-off of the aircraft. Moreover, the angle of incidence of the air flow experienced by the aircraft is small compared with that experienced by a non-inclined propeller. This makes it possible to limit the torque that the propeller exerts on the structure of the wing. It is the torque generated by the propeller, in a direction orthogonal to its rotational axis, when it is subjected to a flow that is inclined with respect to its rotational axis.

The shape of the exhaust cone of the primary flow of the engine is suitable for preventing the gases in the primary flow from burning the wall of the wing when the engine is in the high-traction position.

In this embodiment, the position of the engine is controlled solely by the thrust. An actuator is not required in this simple and reliable solution.

However, providing a solution with a suitable actuator (not illustrated) which would make it possible to control the position of the engine independently of the degree of thrust, according to the various flight phases, and to provide, where necessary, locking of the position of the engine, does fall within the scope of the invention.

The solution of the invention has been shown schematically by only two connecting rods forming a quadrilateral, but the invention includes equivalent solutions provided that the connection means is deformable.

The invention claimed is:

1. An assembly of a propulsion engine of an aircraft and a system for attaching a strut for mounting the engine on a structure of an aircraft, on its wing, the attachment system comprising:
   a first attachment means, fixed to the strut;
   a second attachment means configured to be fixed to the structure of the aircraft; and a connection means connecting the first attachment means to the second attachment means, the connection means configured to allow movement of the first attachment means relative to the second attachment means between a first position and a second position when the engine is subjected to forces resulting from thrust and weight of the engine, wherein the connection means forms a deformable trapezoidal structure with first and second vertices of the trapezoid fixed with respect to the first attachment means, and third and fourth vertices of the trapezoid fixed with respect to the second attachment means, wherein the first vertex of the trapezoid is upstream of the second vertex of the trapezoid, the third vertex is upstream of the fourth vertex of the trapezoid, an upstream connecting rod connects first vertex and the third vertex, and a downstream connecting rod connects the second vertex and the fourth vertex, wherein the upstream connecting rod and the downstream connecting rod are rigid rods having a fixed length, and wherein the length of the downstream connecting rod is different from the length of the upstream connecting rod.

2. An assembly according to claim 1, wherein the first position corresponds to a stopped or cruising-flight position and the second position corresponds to a climbing position of the aircraft.

3. An assembly according to claim 1, wherein the connection means comprises a movement damper, or a movement damper associated with a member for returning to the first position.

4. An assembly according to claim 1, wherein the force corresponds to an ascending flight phase.

5. An assembly according to claim 1, wherein the downstream connecting rod is longer than the upstream connecting rod, and wherein, in the second position, the engine tilts downward such that a propeller of the engine blows directly on a wing of the aircraft.

6. An assembly according to claim 5, wherein the engine is an open rotor engine including first and second unducted propellers, and wherein, in the second position, the engine tilts downward such that the first and second propellers blow directly onto the wing of the aircraft.

7. An assembly according to claim 6, wherein the engine includes first and second turbines connected to first and second rotors, respectively, which drive the first and second propellers, respectively, and the first vertex is disposed downstream from the first turbine.

* * * * *